(No Model.)
R. SCHICHT.
EVAPORATING APPARATUS.
No. 538,387. Patented Apr. 30, 1895.
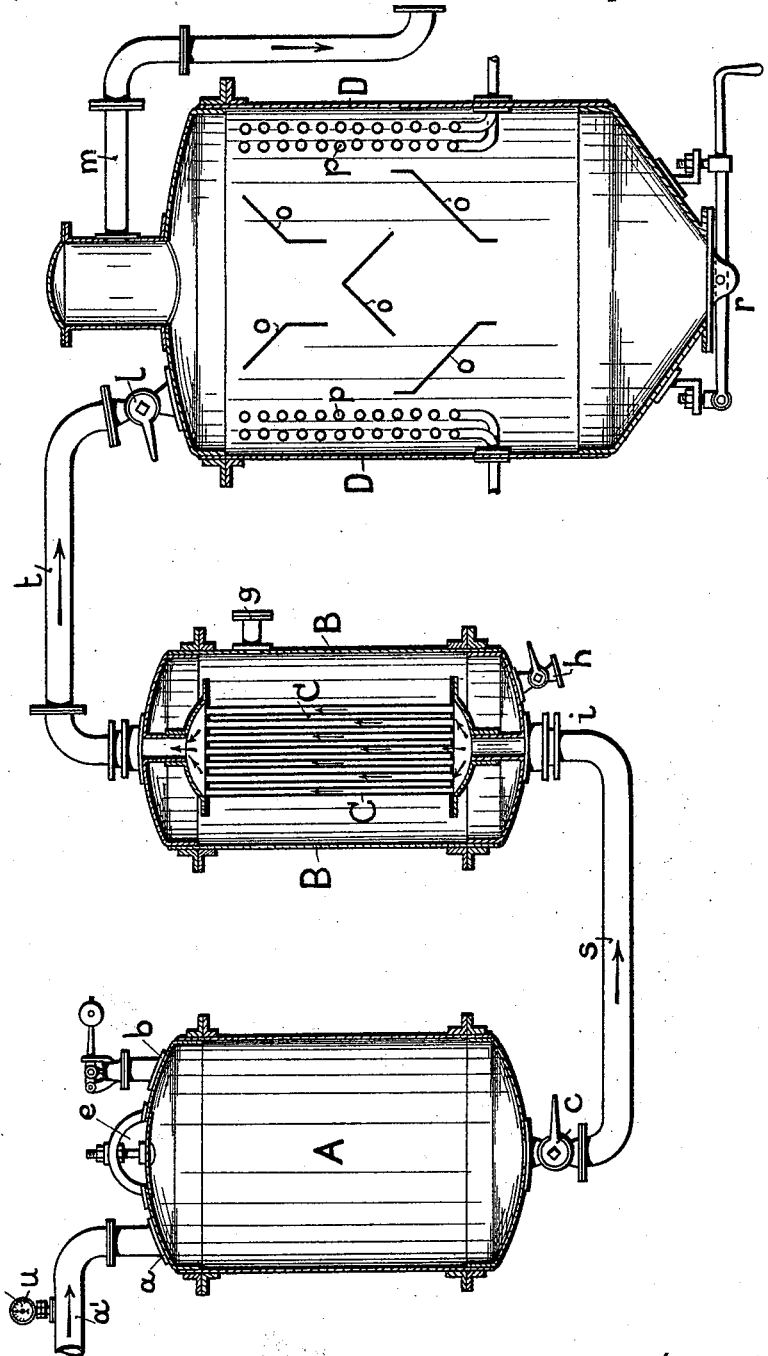

UNITED STATES PATENT OFFICE.

RUDOLF SCHICHT, OF AUSSEGG, AUSTRIA-HUNGARY.

EVAPORATING APPARATUS.

SPECIFICATION forming part of Letters Patent No. 538,387, dated April 30, 1895.

Application filed September 25, 1894. Serial No. 524,063. (No model.)

*To all whom it may concern:*

Be it known that I, RUDOLF SCHICHT, manufacturer, a subject of the Emperor of Austria-Hungary, residing at Aussegg-on-the-Elbe, Austria-Hungary, have invented certain new and useful Improvements in Evaporating Apparatus; and I do hereby declare the following to be a full, clear, and exact description of the invention, such as will enable others skilled in the art to which it appertains to make and use the same.

My invention relates to apparatus for drying substances, such as soap, molasses, concentrated solutions of glue, juices from fruits, and milk, which in the hot state have a viscous or semi-fluid consistency and are consequently liable to burn to the heating surfaces of the drying apparatus heretofore employed. It is the object of my said invention to completely obviate such burning. I have found that this object may be accomplished if the drying is effected, not as heretofore in one operation, but in two phases by first incorporating under pressure the entire heat required for the drying with the substance to be dried and then causing the substance sufficiently heated throughout to pass into a vessel preferably also heated but subjected to a low pressure.

In carrying this method into practice I prefer to use an apparatus which consists of a vessel subjected to pressure, a heating device and a vacuum vessel, and which is adapted to be connected with an air compressor, a source of heat and a vacuum pump or an exhauster. Such an apparatus is represented in diagram in the accompanying drawing.

A closed vessel A consisting of metal and made sufficiently strong to withstand great pressure is connected by a pipe $a'$ with an air compressor and by a pipe $s$ with a heating device B. This vessel is preferably so constructed that it can withstand a pressure of from fifteen to eighteen atmospheres to render it suitable for high temperatures.

On the vessel A I arrange as fittings a flanged connection $a$, to which is joined a pipe $a'$ serving for the admission of compressed air and provided with a pressure gage $u$, a manhole $e$ and a flanged connection $b$ for a safety valve.

A second closed metallic vessel B communicates with the first vessel A through a pipe $s$ furnished with a cock $c$. In this vessel is provided a system of pipes C designed for heating the substance to be dried. This system consists of a great number of pipes which are let at their two ends into a metallic plate so as to form steam-tight joints. This system of pipes is closed above and below by funnel-shaped heads. In the lower head terminates at $i$ the pipe $s$ coming from the vessel A, while the upper head is connected with a vacuum vessel D by the pipe $t$. The vessel B is also connected with a source of heat, such as a steam boiler, steam or air superheater or the like, by a pipe $g$ through which the heat designed for heating the substance is introduced. The water of condensation collecting in the vessel B can be removed through the discharge cock $h$.

In the vacuum vessel D I provide inclined planes $o$ $o$ in order to obtain a better distribution of the substance to be dried. In this vessel D may be arranged heating pipes $p$ for supporting the boiling of the substance. The connection of the vessel D with a vacuum pump is established by a pipe $m$. A cock $l$ is included in the pipe $t$ which connects the vessels D and B with each other. On terminating the operation the dried substance may be removed by a discharging device $r$.

The devices used merely as auxiliaries, such as the air compressor and the vacuum pump or the exhauster are not represented, as the arrangement of the same is of no importance as far as the essential feature of the present invention is concerned. Moreover the fittings of the apparatus are only characterized sufficiently for enabling the improved apparatus to be understood, the construction of these parts being immaterial.

For effecting the operation by means of this apparatus I proceed as follows: The vessel A is filled through the manhole $e$ or in any other suitable manner with the substance to be dried. Then the air compressor is set in motion to force air into the vessel A, such air being preferably caused to pass through a heating device prior to its admission into the drying apparatus. As soon as the pressure in the vessel A has attained the desired degree, which may be seen by the pressure gage $u$, a steam valve provided at $g$ and the cock $c$ on the vessel A are opened at the same time.

I can regulate the heating of the substance passing from the vessel A to the vessel B by the cock $l$ on the vacuum vessel D in such a manner that the substance in front of the said cock $l$ will always be under pressure and flow into the vacuum vessel at a boiling temperature corresponding to such pressure. In the equalization of the pressure and temperature here taking place the heat in excess which is inherent in the substance becomes free and vaporizes a corresponding portion of the water contained in the substance. Accordingly this substance enters the vacuum vessel D in a highly heated state and while energetically boiling flows over the inclined planes arranged in the upper part of the said vacuum vessel. Of course the vacuum is maintained in the vessel D by a pump or an exhauster as long as the operation lasts. This is terminated when the substance to be dried has passed completely from the vessel A into the vessel D and has cooled therein to such an extent that it discontinues to boil, whereupon it may be removed through a discharging device arranged at the lower part of the vacuum vessel.

It is necessary to heat the substance under pressure in order to prevent the boiling of the substance contained in the vessels A and B and the pipes belonging thereto, for the substance would otherwise burn to the inner sides of the pipes C and render the operation impossible. The pressure supplied by the air compressor must therefore always be higher during the operation than the pressure produced by the heating of the substance in the system of pipes C. For watching the pressures and temperatures I provide pressure gages and thermometers in a suitable manner on the vessels A and B. In order to prevent the rapid lowering of the temperature of the substance in the vessel D and thus keep this substance hot and boiling for a longer time it is expedient to arrange in the upper part of the said vessel D also a system of pipes $p\ p$ for heating by steam or hot air and to surround the lower part on the outside with a non-conducting material.

What I claim is—

1. The combination, with the vessel A for holding liquid and air under pressure, the heating vessel B provided with heating apparatus, and a pipe connecting the vessels A and B; of the vacuum vessel D provided with heating pipes and inclined plates $o$ supported one above the other for the liquid to impinge on, and a pipe $t$ for conducting the hot liquid from the heating vessel to the vacuum vessel, substantially as set forth.

2. The combination, with the vessel A for holding the liquid and air under pressure, of the heating vessel B provided with a series of pipes C and connections for admitting steam around the said pipes, a pipe $s$ provided with a valve $c$ and connecting the lower part of the vessel A with the pipes C, the vacuum vessel D provided with heating pipes $p$ and inclined plates $o$ supported one above the other for the liquid to impinge on, and the pipe $t$ provided with a valve $l$ and connecting the pipes C with the upper part of the vessel D, substantially as set forth.

In testimony whereof I affix my signature in presence of two witnesses.

RUDOLF SCHICHT.

Witnesses:
JOHN B. JACKSON,
MAX WAGNER.